(12) United States Patent
Bojjireddy et al.

(10) Patent No.: US 8,245,189 B2
(45) Date of Patent: Aug. 14, 2012

(54) GENERICALLY MANAGING THE CONFIGURATION OF HETEROGENEOUS SOFTWARE ARTIFACTS

(75) Inventors: Karunakar Bojjireddy, Apex, NC (US); Carroll E. Fulkerson, Jr., Raleigh, NC (US); Amber Roy Chowdhury, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1454 days.

(21) Appl. No.: 11/766,550

(22) Filed: Jun. 21, 2007

(65) Prior Publication Data
US 2008/0320467 A1 Dec. 25, 2008

(51) Int. Cl.
*G06F 9/44* (2006.01)
(52) U.S. Cl. ....................................................... 717/117
(58) Field of Classification Search .................. 717/107, 717/117; 715/234–235; 707/999.101, 999.102; 719/328; 455/418
See application file for complete search history.

(56) References Cited

U.S. PATENT DOCUMENTS

| | | | | |
|---|---|---|---|---|
| 7,877,732 B2* | 1/2011 | Day et al. | ...................... | 717/124 |
| 2004/0015783 A1* | 1/2004 | Lennon et al. | ................ | 715/523 |
| 2004/0142683 A1* | 7/2004 | Clark et al. | .................... | 455/418 |
| 2005/0114240 A1* | 5/2005 | Watson-Luke et al. | ......... | 705/34 |
| 2005/0223392 A1* | 10/2005 | Cox et al. | ...................... | 719/328 |
| 2005/0273703 A1* | 12/2005 | Doughan | ...................... | 715/513 |

* cited by examiner

*Primary Examiner* — Tuan Anh Vu
(74) *Attorney, Agent, or Firm* — Yudell Isidore Ng Russell PLLC

(57) ABSTRACT

A method for managing a configuration of heterogeneous software artifacts uses a common central configuration representation. An artifact of an unknown type, from an initial software solution, is submitted to a solution configuration tool. The solution configuration tool sends a request to a solution architect for locations of configuration files within the artifact. For each artifact whose configuration file locations have been requested from the solution architect, the solution configuration tool determines if each corresponding configuration file is a property file or an Extensible Markup Language (XML) file. If the corresponding configuration file is an XML file, then the solution architect provides a first and second xPath for locating the names and values of the configuration parameters in the XML configuration file. The configuration file and configuration parameter locator information is then stored in a configuration locator file. Information in the configuration locator file is used to introspect configuration parameters from the artifacts and store these generically in a central configuration file. Solution-level parameters are then defined and mapped to artifact-level parameters for use in configuring subsequent software solutions instantiated from the initial software solution.

4 Claims, 4 Drawing Sheets

GENERICALLY MANAGING THE CONFIGURATION OF HETEROGENEOUS SOFTWARE ARTIFACTS

BACKGROUND OF THE INVENTION

The present disclosure relates to the field of computers, and specifically to software. Still more specifically, the present disclosure relates to harmonizing configuration parameters found in heterogeneous software artifacts.

Different types of software artifacts each have their own mechanism for specifying configuration information. Sometimes, these are governed by a standard which the artifact adheres to; at other times, it may be an ad-hoc mechanism. Property files and eXtensible Markup Language (XML) files are two common approaches to specifying configuration information. In the case of specific software artifacts which use XML for configuration, the XML file needs two pathways: one for the name of the file, and one for the value of the file.

Because of the heterogeneity of the software artifacts in a software solution and plethora of configuration parameters associated with the various artifacts, each following their own representation and naming convention, configuring a software solution and making it operational for a particular use (say, for a particular customer), is a labor intensive, time consuming process.

BRIEF SUMMARY OF THE INVENTION

A method for managing a configuration of heterogeneous software artifacts uses a common central configuration representation. An artifact of an unknown type, from an initial software solution, is submitted to a solution configuration tool. The solution configuration tool sends a request to a solution architect for locations of configuration files within the artifact. For each artifact whose configuration file locations have been requested from the solution architect, the solution configuration tool determines if each corresponding configuration file is a property file or an Extensible Markup Language (XML) file. If the corresponding configuration file is an XML file, then the solution architect provides a first and second xPath for locating the names and values of configuration parameters in the XML configuration file. The configuration file and configuration parameter locator information is then stored in a configuration locator file. Information in the configuration locator file is used to introspect configuration parameters from the artifacts and store these generically in a central configuration file. Solution-level parameters are then defined and mapped to artifact-level parameters for use in configuring subsequent software solutions instantiated from the initial software solution.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
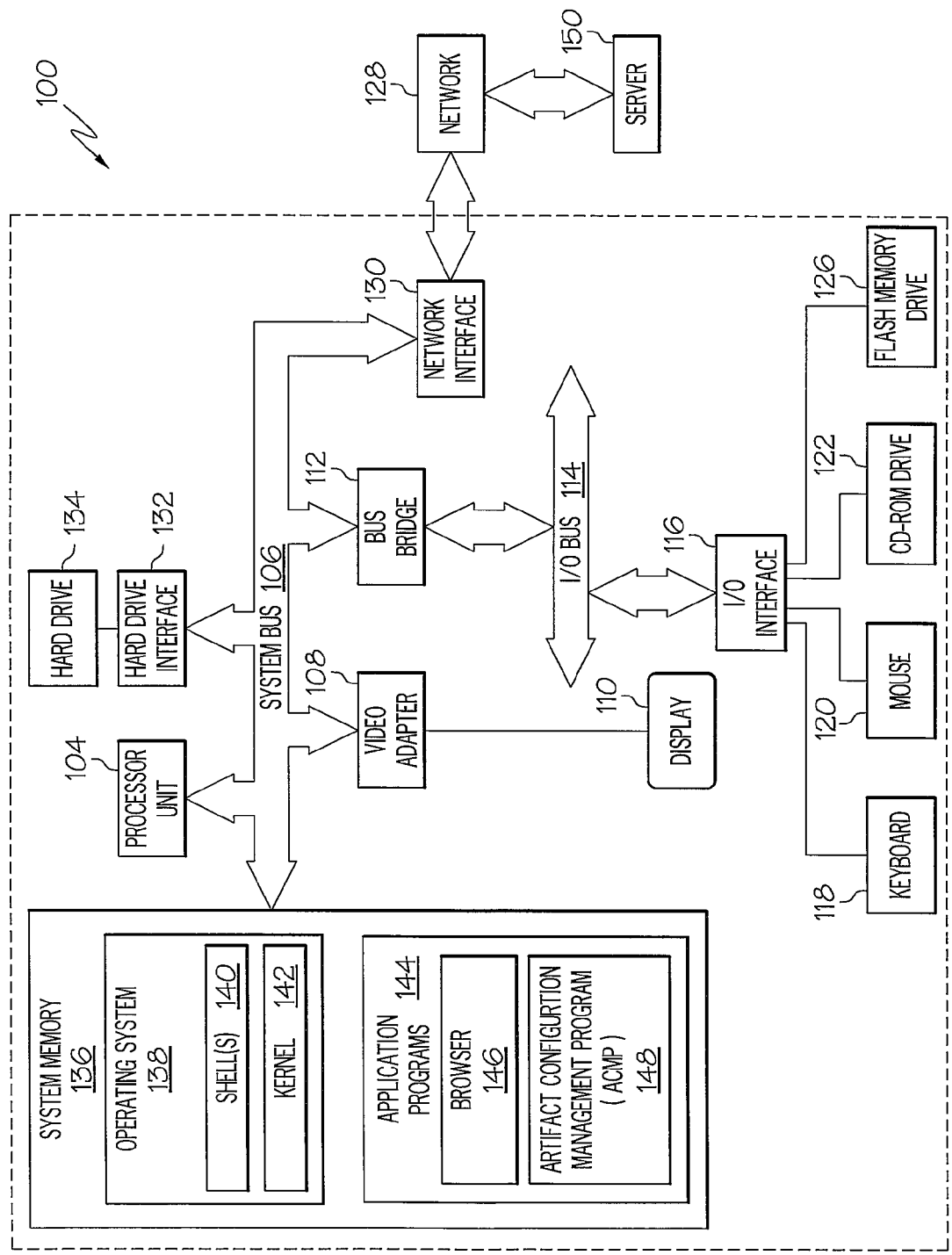
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an Artifact Configuration Management Program (ACMP) 148. ACMP 148 performs the functions illustrated below in FIG. 3A-B, and may include the Solution Configuration Tool 212 and Solution Repository 216 shown below in FIG. 2.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
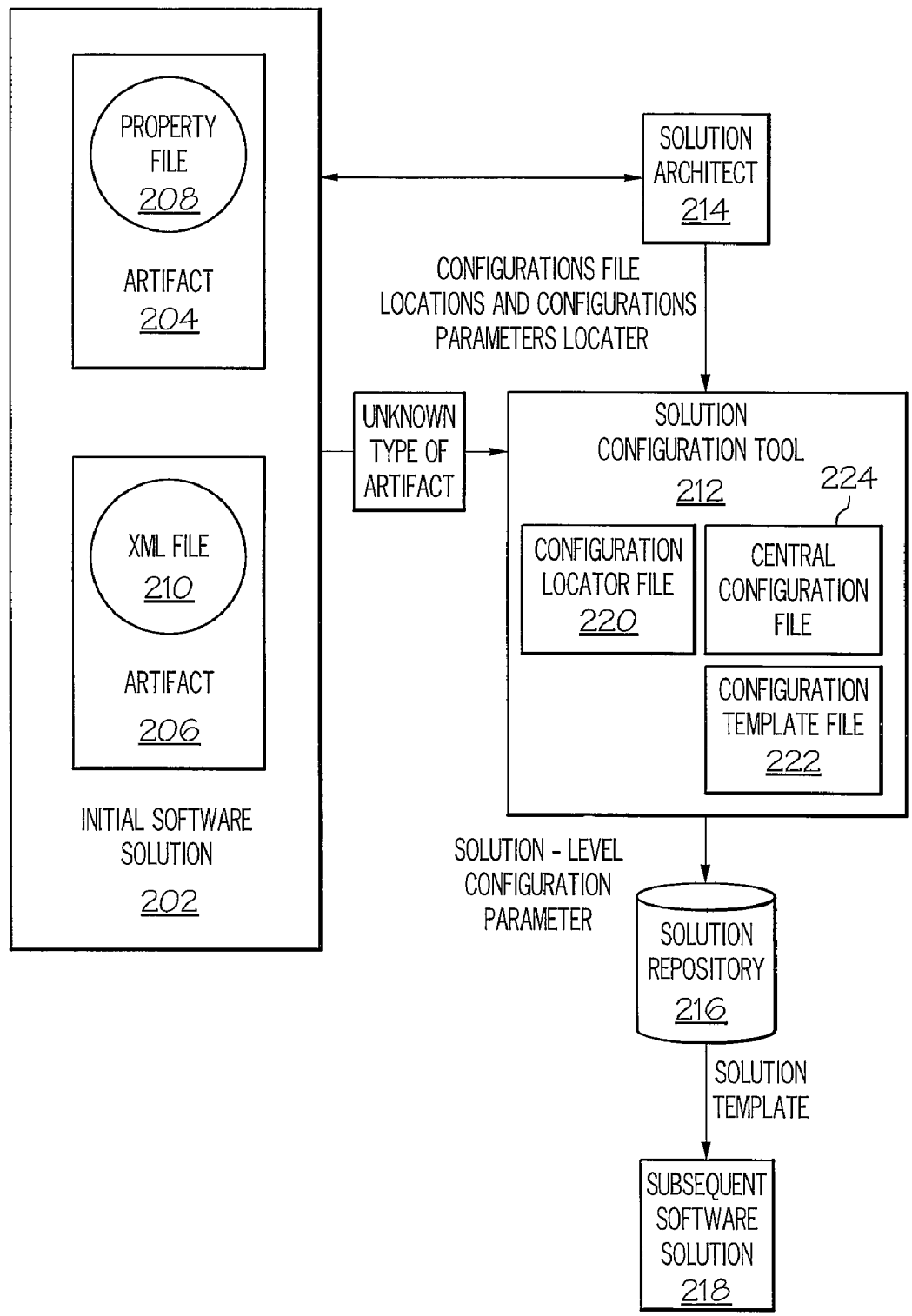
FIG. 2 illustrates a relationship among existing software artifacts and a solution configuration tool.

With reference now to FIG. 2, an overview of the present invention is presented. An initial software solution 202 may be made up of multiple disparate software artifacts, including the depicted artifact 204 and artifact 206. Such artifacts may be portlet applications, Service Component Architecture (SCA) modules, Java2 Enterprise Edition (J2EE) applications, DB2 scripts, etc. Each artifact contains an associated configuration file. As depicted in exemplary manner, the configuration file for artifact 204 is a property file 208, which includes a name that leads to one or more values used in the configuration of artifact 204. Thus, by knowing the name of the property file, the value is readily available. Alternatively, however, artifact 206 stores its configuration file as an XML file 210. In order to find the names and values of the configuration parameters in XML file 210, two xPaths must be provided, which respectively resolve to corresponding names and values of configuration parameters in the XML file 210.

An unknown type of artifact may be sent to a solution configuration tool 212. The solution configuration tool may support several "known" artifact types which follow specific standards (e.g., JSR-168, J2EE, SCA etc) which govern how they provide their configuration information; and may process such known artifact types without human assistance. Unknown artifact types fall outside of the standards-compliant artifacts for which configuration information can be extracted from well-known files and schemas by the tool. Configuration information associated with unknown artifact types may be processed by the tool, as long as the information is provided through properties files or XML files (which may follow arbitrary schemas). The solution configuration tool 212 then sends a request to a solution architect 214 (a human), asking for the location of the configuration file that is associated with the received artifact. The solution architect 214 provides the location of the file, relative to the artifact package, to the tool. If the configuration file is a property file, then the location is sufficient for the tool to read the file and process the configuration information in the file. However, if the configuration file is an XML file, then the solution architect 214 must provide two XML xPaths: the first resolving to the names of the configuration parameters and the second to the values of the configuration parameters.

Several useful variants of the above process are possible without detracting from the main idea of the disclosure.

Multiple configuration files can be provided for a single artifact by repeating the process described above for each file.

Instead of requiring the human to input the location of the configuration file, the tool may introspect the artifact package to produce an initial list of potential configuration files (say, by selecting files that have a ".properties" or a ".xml" suffix) and then filtering these according to pre-specified pattern matching criteria or through human assistance. The locations of the files to be processed could also be provided in a well-known file placed in the artifact package; this would require pre-processing of the artifact prior to inputting it to the tool, but would not require subsequent human assistance to locate the configuration file.

As an alternative to, or in addition to, the xPath based property location mechanism described above, attributes from a well-known schema could be used to augment XML elements in the arbitrary XML configuration files to indicate the elements providing configuration parameter information, such as the names and the values. This approach assumes that the XML schema governing the configuration file supports extensibility in this manner, which is usually the case for a well-designed XML schema. This approach would require some pre-processing of the unknown artifact prior to it being input to the tool, but would avoid the need for human assistance during the assembly process.

In addition to the names and the values of the configuration parameters, any of the above methods for locating configuration parameter information could be extended to provide additional optional parameter information, such as a display name or a description.

"Known" artifact types can also leverage the mechanisms proposed above to support their usage of additional configuration files outside of the standards compliant mechanisms implied by the standard governing the artifact type. This may be useful to support situations where the standards-compliant artifact uses non-standard configuration mechanisms in addition to, or instead of, the standard-compliant, "known" mechanisms implied by the known artifact type and automatically processed by the solution configuration tool.

When the solution architect 214 provides the requisite information for locating the configuration file for the received artifact, using the method described above and/or the variants described above, the configuration locator file 220 is then updated. The solution configuration tool 212 can then access the appropriate configuration file and locate all needed configuration parameters. Such configuration parameters include, but are not limited to, variables controlling solution behavior (such as enablement of optional modules), service endpoints, display text, layout characteristics, font type and size etc. In the solution configuration tool 212, these configuration parameters are mapped to a set of solution-level configuration parameters. The solution together with the solution-level configuration parameters are stored in a solution repository 216 at which point it may be referred to as a solution template. The solution template may then be used to instantiate a subsequent software solution 218, referred to as a solution instance. Note that the artifact-level parameters in the solution instance 218 are kept hidden from tools which are used to further configure the solution instance; such configuration is done by manipulating the solution-level configuration parameters.

The solution instance may undergo several stages of configuration, when some subset of its exposed solution-level parameters is set. At each configuration stage, some solution-level parameters may be hidden, to prevent their being subsequently visible, or marked read-only, to prevent their being subsequently changed. After the final configuration stage, the values configured on the set of solution-level parameters are mapped back to the artifact-level configuration parameters. The configured solution artifacts which comprise the solution instance are then installed on a set of target computer systems.

The number of configuration stages may vary based on the intended use of the solution instances. For example, where the software solution is designed to be instantiated as a service for subscribers, there may be two stages of configuration, the first being used to create a partially configured "service offering" which can then be subscribed to by a customer; and the second being used to complete the remainder of the configuration in accordance with the subscriber's requirements in order to create a "service offering instance".

A single solution template may be used to instantiate multiple solution instances, each of which may be configured differently. For example, in the service delivery scenario introduced in the immediately preceding paragraph above, multiple service offerings may be created out of a single solution template by applying different partial configurations, perhaps reflecting different subsets of function and qualities of service; and multiple service offering instances may be created out of each service offering, by completing the solution configuration in accordance with the subscriber requirements.

The solution configuration tool 212 may be built using any language and environment. In a preferred embodiment, solution configuration tool 212 uses Java and Eclipse plugins. A configuration template file stores the virtualized solution level parameters and the mapping from each solution level parameter to the artifact level parameters.

In a preferred embodiment, a config locator file tells the solution configuration tool 214 how to introspect the configuration template file 222 and the central configuration file 224, and how to then store the introspected configuration in a generic form. Note that mapping information is stored in the configuration template file 222.

Figure 3A:
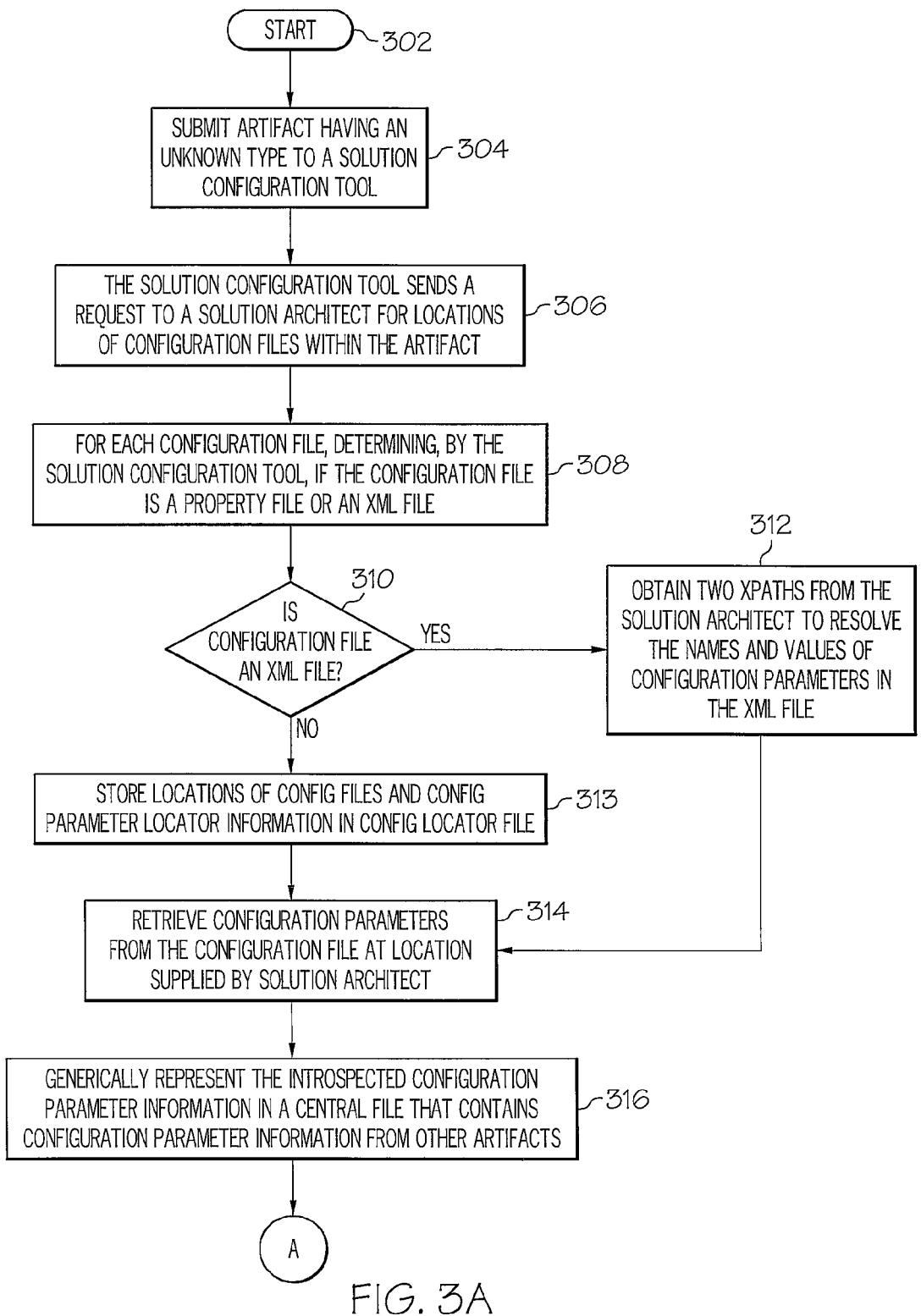
FIG. 3A-B is a high-level flow-chart of exemplary steps taken to persistently allow artifact configurations from an initial software solution to be utilized by a subsequent software solution.
Figure 3B:
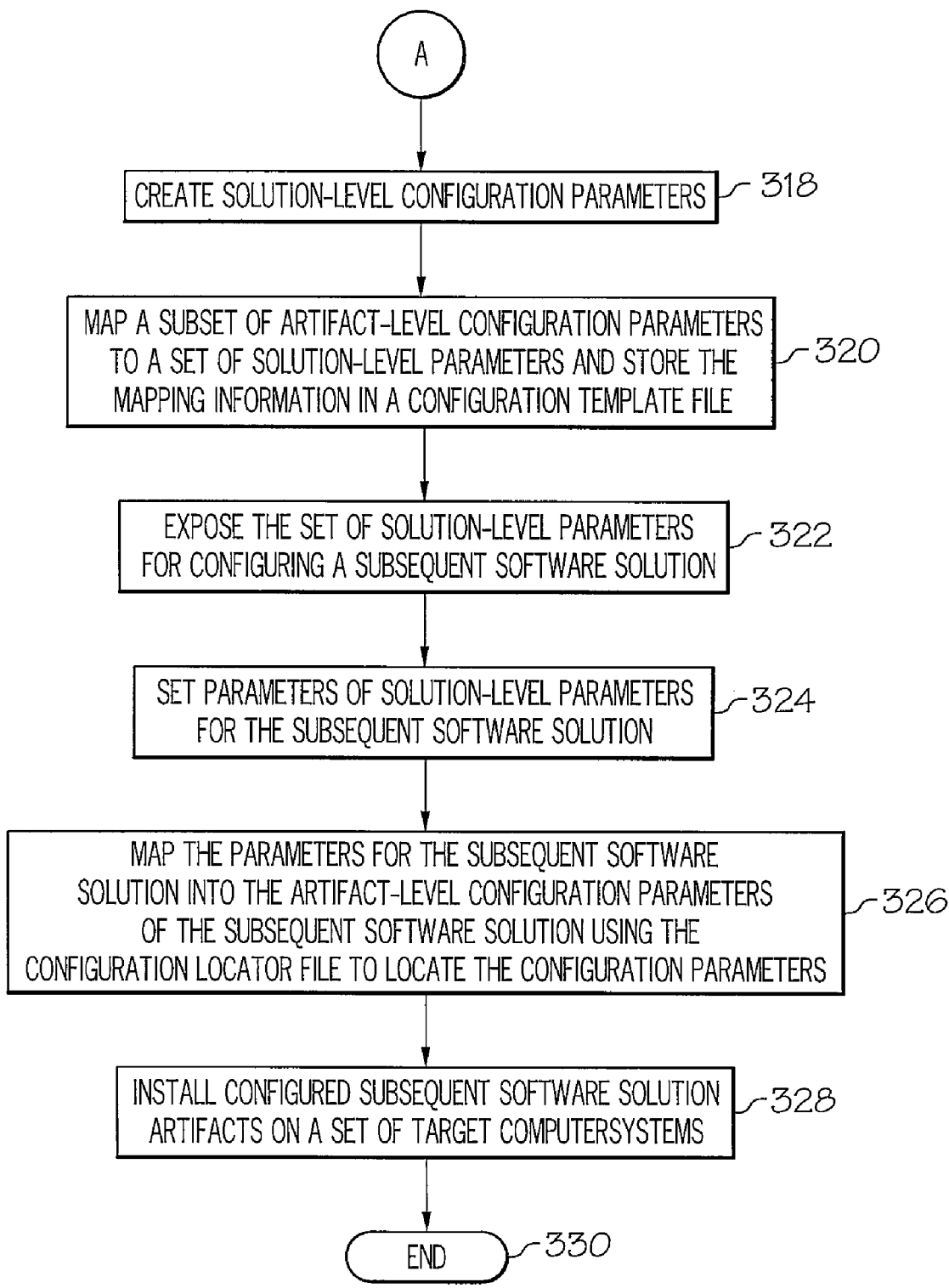

Referring now to FIG. 3A, a flow-chart of exemplary steps taken to manage disparate software artifacts is presented. After initiator block 302, an artifact, which has an unknown configuration type, from an initial software solution is submitted to a solution configuration tool (block 304). The solution configuration tool then sends a request to a human solution architect, asking for a location (e.g., relative or absolute file path for a property file, Uniform Resource Locator (URL) for an XML file) for the configuration file (block 306). For each configuration file, the solution configuration tool determines if the configuration file is a property file or an XML file (block 308). If the configuration file is an XML file (query block 310), then two xPaths are obtained from the solution architect (block 312), thus providing pathways to both the XML names and values for the configuration parameters of the artifact. Note also that a configuration locator file within the solution configuration tool is updated with the configuration file and configuration parameter locator information for each artifact received by the solution configuration tool. If the configuration file is a property file, then the location of the file is stored in the configuration locator file (block 313). If the configuration file is an XML file, then the location of the configuration file, together with the configuration locator information itself (i.e., the supplied xPaths) is stored in the configuration locator file (also block 313). This locator information is used in the step described below in block 326.

After the configuration file locations are obtained (for either a property file or an XML file), parameter information is retrieved (block 314). This retrieved parameter information, which includes the names of, and the values found in, the configuration files found within the artifact in the initial software solution, is then generically represented in a central configuration file that contains other configuration files from other artifacts (block 316). This retrieved property information is then mapped to multiple solution-level configuration parameters (block 318). These solution-level configuration parameters are parameters that are utilized at the software solution level (rather than the artifact level), and are thus more generic (agnostic to the type of artifacts used) than the artifacts themselves. The solution-level parameter information and the mapping information are stored in another file, the configuration template file.

A subset of artifact-level configuration parameters is then mapped to a set of solution-level parameters (block 320). Note that the subset which is mapped to a solution-level parameter may include artifact-level parameters from both "known" and "unknown" artifact types. These solution-level parameters are accessible when configuring other software solutions instantiated from the solution template, but the underlying mapped-to artifact-level configuration parameters are not directly accessible. Thus, the person configuring the subsequent software solution cannot directly manipulate (e.g., change) the artifact-level configuration parameters.

The set of solution-level parameters are then exposed to configure a subsequent software solution (block 322). Without directly touching the underlying artifact-level configuration parameters, the parameters of the solution-level parameters are then set for the subsequent software solution (block 324). That is, a software administrator sets high-level solution-level configuration parameters (e.g., table sizes, variable names, optional controls, service endpoints, etc.) for the subsequent solution software. These solution-level configuration parameters are then mapped back to the artifact-level configuration parameters of the subsequent software solution (block 326). Since the locations of the mapped parameters in the "unknown" artifact types are known from the configuration locator file, the configuration of the "unknown" artifact types can also be updated. The configured subsequent software solution artifacts are then installed on a set of target computer systems (block 328). The process ends at terminator block 330.

Note that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for managing a configuration of heterogeneous software artifacts through a common central configuration representation, the method comprising:

submitting an artifact of an unknown type to a solution configuration tool, wherein the artifact is from an initial software solution;

transmitting a request, from the solution configuration tool to a solution architect, for locations of configuration files within the artifact;

for each artifact whose configuration file locations have been requested from the solution architect, determining, by the solution configuration tool, if each corresponding configuration file is a property file or an Extensible Markup Language (XML) file;

in response to determining that the corresponding configuration file is an XML file, obtaining, from the solution architect, a first and second xPath, wherein the first xPath resolves to the names of configuration parameters in the corresponding configuration file, and wherein the second xPath resolves to the corresponding values of the configuration parameters whose names are identified by the first xPath;

storing the locations of the configuration files and locations of the configuration parameters within configuration files in a configuration locator file;

introspecting configuration parameter information from the configuration files using the locations of the configuration files and the configuration parameters that are stored in the configuration locator file, wherein the configuration files include both property files and XML files, and wherein the configuration parameter information includes both the names and values of the configuration parameters within the configuration file;

generically representing the property information in a central configuration file as artifact-level configuration parameters, wherein the central configuration file includes introspected configuration information for other artifacts;

mapping a subset of the artifact-level configuration parameters to a set of solution-level parameters and storing the mapping information in a configuration template file;

exposing the set of solution-level parameters for configuring a subsequent software solution, wherein the artifact-level configuration parameters from the initial software solution are never directly exposed or manipulatable when configuring subsequent software solution;

setting, for the subsequent software solution, parameters for one or more of the solution-level parameters;

mapping the parameters for the subsequent software solution back to the artifact-level configuration parameters of the subsequent software solution; and installing the subsequent software solution on a set of target computer systems.

2. The method of claim 1, further comprising:
setting a subset of the presented extracted artifact-level configuration parameters as a default set of solution-level parameters for the subsequent software solution.

3. A computer program product for managing a configuration of heterogeneous software artifacts through a common central configuration representation, the computer program product comprising:

a computer usable medium having computer usable program code embodied therewith, the computer usable program code comprising:

computer usable program code configured to submit an artifact of an unknown type to a solution configuration tool, wherein the artifact is from an initial software solution;

computer usable program code configured to transmit a request, from the solution configuration tool to a solution architect, for locations of configuration files within the artifact;

computer usable program code configured to determine, for each artifact whose configuration file locations have been requested from the solution architect, if each corresponding configuration file is a property file or an Extensible Markup Language (XML) file;

computer usable program code configured to, in response to determining that the corresponding configuration file is an XML file, obtain, from the solution architect, a first and second xPath, wherein the first xPath resolves the names of the configuration parameters in the corresponding configuration file, and wherein the second xPath resolves to the corresponding values of the configuration parameters whose names are identified by the first xPath;

computer usable program code configured to store the locations of the configuration files and locations of the configuration parameters within configuration files in a configuration locator file;

computer usable program code configured to introspect configuration parameter information from the configuration files using the locations of the configuration files and the configuration parameters that are stored in the configuration locator file, wherein the configuration files include both property files and XML files, and wherein the configuration parameter information includes both the names and values of the configuration parameters within the configuration file;

computer usable program code configured to generically represent the introspected configuration parameter information in a central configuration file as artifact-level configuration parameters, wherein the central configuration file includes configuration information for other artifacts;

computer usable program code configured to map a subset of the artifact-level configuration parameters to a set of solution-level parameters;

computer usable program code configured to expose the set of solution-level parameters for configuring a subsequent software solution, wherein the artifact-level configuration parameters from the initial software solution are never directly exposed or manipulatable while configuring the subsequent software solution; computer usable program code configured to set, for the subsequent software solution, parameters for one or more of the solution-level parameters;

computer usable program code configured to map the parameters for the subsequent software solution back to the artifact-level configuration parameters of the subsequent software solution; and computer usable program code configured to install the subsequent software solution on a set of target computer systems.

4. The computer program product of claim 3, further comprising:
computer usable program code configured to set a subset of the presented extracted artifact-level configuration parameters as a default set of solution-level parameters for the subsequent software solution.

* * * * *